United States Patent
Lin et al.

(10) Patent No.: US 11,138,903 B2
(45) Date of Patent: Oct. 5, 2021

(54) METHOD, APPARATUS, DEVICE AND SYSTEM FOR SIGN LANGUAGE TRANSLATION

(71) Applicant: BEIJING BAIDU NETCOM SCIENCE TECHNOLOGY CO., LTD., Beijing (CN)

(72) Inventors: Xiangyue Lin, Beijing (CN); Kun Liu, Beijing (CN); Shuangshuang Qiao, Beijing (CN); Yang Liang, Beijing (CN); Chao Han, Beijing (CN); Mingfa Zhu, Beijing (CN); Jiangliang Guo, Beijing (CN); Xu Li, Beijing (CN); Jun Liu, Beijing (CN); Shuo Li, Beijing (CN); Shiming Yin, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 240 days.

(21) Appl. No.: 16/278,690

(22) Filed: Feb. 18, 2019

(65) Prior Publication Data

US 2020/0005673 A1 Jan. 2, 2020

(30) Foreign Application Priority Data

Jun. 29, 2018 (CN) .......................... 201810695335.8

(51) Int. Cl.
*G09B 21/00* (2006.01)
*G06F 40/58* (2020.01)
*G06K 9/00* (2006.01)

(52) U.S. Cl.
CPC ........... *G09B 21/009* (2013.01); *G06F 40/58* (2020.01); *G06K 9/00355* (2013.01)

(58) Field of Classification Search
CPC .... G06K 9/00355; G09B 21/009; G06F 40/58
See application file for complete search history.

(56) References Cited

U.S. PATENT DOCUMENTS 5,659,764 A * 8/1997 Sakiyama ............... G06F 3/017
340/4.13
7,149,970 B1 * 12/2006 Pratley .................... G10L 15/22
715/257

(Continued)

FOREIGN PATENT DOCUMENTS

| CN | 105957514 A | 9/2016 |
| CN | 107103311 | 8/2017 |
| CN | 107690651 A | 2/2018 |

OTHER PUBLICATIONS

Li, Yun, "Research of Chinese Sign Language Recognition and Exploration of Rehabilitation Application based on Surface Electromyogram" A disseration for doctor's degree of University of Science and Technology of China; (Oct. 2013); English Abstract is at pp. III-V.

(Continued)

*Primary Examiner* — Michael Colucci
(74) *Attorney, Agent, or Firm* — J.C. Patents (57) ABSTRACT

The present disclosure provides a method, an apparatus, a device and a system for sign language translation, where a server receives video information sent by a terminal device, and preprocesses the video information to obtain at least one sign language action; the at least one sign language action is input into a sign language model for classification and prediction to obtain a word corresponding to the at least one sign language action; each word is input into a language model to determine whether an intention expression is complete; and each word is sent to the terminal device when the intention expression is complete, so that the terminal device displays each word, thereby realizing the translation (Continued)

of the sign language action into text, enabling the ordinary persons to better understand intentions of the hearing impaired, thus improving efficiency of communications.

20 Claims, 6 Drawing Sheets

(56) References Cited

U.S. PATENT DOCUMENTS

| | | | | |
|---|---|---|---|---|
| 7,321,854 | B2* | 1/2008 | Sharma | G06K 9/00335 |
| | | | | 704/243 |
| 7,574,020 | B2* | 8/2009 | Shamaie | G06K 9/6247 |
| | | | | 382/103 |
| 10,037,458 | B1* | 7/2018 | Mahmoud | G06K 9/00389 |
| 2003/0191779 | A1* | 10/2003 | Sagawa | G09B 21/00 |
| 2011/0060587 | A1* | 3/2011 | Phillips | G10L 15/30 |
| | | | | 704/235 |
| 2011/0274311 | A1 | 11/2011 | Lee et al. | |
| 2013/0051614 | A1* | 2/2013 | Lee | G06K 9/00355 |
| | | | | 382/103 |
| 2016/0307469 | A1* | 10/2016 | Zhou | G06K 9/6217 |
| 2018/0122144 | A1* | 5/2018 | Hubo | G06T 15/20 |
| 2019/0340426 | A1* | 11/2019 | Rangarajan | G06K 9/00355 |

OTHER PUBLICATIONS

The Chinese First Examination Report of corresponding Chinese application No. 201810695335.8, dated Apr. 19, 2019.

* cited by examiner

METHOD, APPARATUS, DEVICE AND SYSTEM FOR SIGN LANGUAGE TRANSLATION

CROSS-REFERENCE TO RELATED APPLICATION

This application claims priority to Chinese Patent Application No. 201810695335.8, filed on Jun. 29, 2018, which is hereby incorporated by reference in its entirety.

TECHNICAL FIELD

The present disclosure relates to the field of artificial intelligence technologies and, in particular, to a method, an apparatus, a device and a system for sign language translation.

BACKGROUND

The number of hearing impaired people in China has reached more than 20 million. With the improvement of social conditions and the protection of social welfare, the living standards of the hearing impaired have improved. At present, the hearing impaired people communicate with ordinary people mainly using sign language. Due to the high learning cost of sign language, it is difficult to achieve universal popularity, which makes the hearing impaired people face many difficulties in the process of communication with the ordinary people.

At present, in order to improve the convenience of communication between the hearing impaired and ordinary people, some sign language robots that convert voice into sign language actions have emerged. By presetting a conversion command in a robot, a common voice in a specific scenario is converted through a one-to-one mapping relationship into a corresponding sign language action to enable the hearing impaired to better understand intentions of the ordinary people.

However, the above prior art sign language robots can only be used to translate voice into a sign language action, but cannot translate the sign language action into text, resulting in a problem that the ordinary people cannot understand intentions of the hearing impaired well.

SUMMARY

The present disclosure provides a method, an apparatus, a device and a system for sign language translation. By identifying a sign language action in a video, the sign language action can be translated into text so that an ordinary person can better understand intentions of the hearing impaired.

In a first aspect, the method for sign language translation provided in the present disclosure includes:

receiving video information sent by the terminal device and preprocessing the video information to obtain at least one sign language action;

inputting the at least one sign language action into a sign language model for classification and prediction to obtain a word corresponding to the at least one sign language action;

inputting the each word into a language model to determine whether an intention expression is complete; and sending the each word to the terminal device when the intention expression is complete.

Optionally, the inputting the at least one sign language action into the sign language model for classification and prediction to obtain the word corresponding to the at least one sign language action includes:

generating, for each sign language action, a prediction request corresponding to the sign language action, where the prediction request includes the sign language action and a collecting time corresponding to the sign language action;

determining, according to a load condition and a resource condition of at least one sign language model, a target sign language model for executing the prediction request; and inputting the prediction request into the target sign language model for classification and prediction to obtain the word corresponding to the sign language action.

Optionally, after the obtaining the word corresponding to the at least one sign language action, further including:

storing the word in a preset buffer according to the collecting time of the sign language action corresponding to the word;

correspondingly, the inputting each word into the language model includes:

obtaining the each word from the buffer, and inputting the each word into the language model.

Optionally, sending the word to the terminal device when a buffering time of the word in the buffer is greater than a preset duration.

Optionally, before the inputting the at least one sign language action into the sign language model for classification and prediction to obtain the word corresponding to the at least one sign language action, further including:

obtaining, for a predetermined number of sign language actions, at least two images taken from different angles respectively to form a training sample library; and training samples in the training sample library to obtain the sign language model by using a deep convolutional neural network algorithm.

Optionally, the method further includes:

receiving a translation type sent by the terminal device, where the translation type includes: a voice type and/or a text type;

correspondingly, the sending the each word to the terminal device includes:

sending the each word to the terminal device in a voice form and/or a text form according to the translation type.

Optionally, the language model is an N-gram model.

In a second aspect, the apparatus for sign language translation provided in the present disclosure includes:

a receiving module, configured to receive video information sent by a terminal device, and preprocess the video information to obtain at least one sign language action;

a predicting module, configured to input the at least one sign language action into a sign language model for classification and prediction to obtain a word corresponding to the at least one sign language action;

a determining module, configured to input the each word into a language model to determine whether an intention expression is complete; and a sending module, configured to send the each word to the terminal device when the intention expression is complete.

Optionally, the predicting module is specifically configured to:

generate, for each sign language action, a prediction request corresponding to the sign language action, where the prediction request includes the sign language action and a collecting time corresponding to the sign language action;

determine, according to a load condition and a resource condition of the at least one sign language model, a target sign language model for executing the prediction request; and input the prediction request into the target sign language model for classification and prediction to obtain the word corresponding to the sign language action.

Optionally, the predicting module is further configured to store the word in a preset buffer according to the collecting time of the sign language action corresponding to the word;

correspondingly, the determining module is specifically configured to obtain the each word from the buffer, and input the each word into the language model.

Optionally, the sending module is further configured to send the word to the terminal device when a buffering time of the word in the buffer is greater than a preset duration.

Optionally, the apparatus further includes: a training module configured to:

obtain, for a predetermined number of sign language actions, at least two images taken from different angles respectively to form a training sample library; and train samples in the training sample library to obtain the sign language model by using a deep convolutional neural network algorithm.

Optionally, the receiving module is further configured to receive a translation type sent by the terminal device, where the translation type includes: a voice type and/or a text type;

correspondingly, the sending module is specifically configured to send the each word to the terminal device in a voice form and/or a text form according to the translation type.

Optionally, the language model is an N-gram model.

In a third aspect, the server provided in the present disclosure includes:

a memory;

a processor; and a computer program;

where the computer program is stored in the memory and configured to be executable by the processor to implement the method according to any solution of the first aspect.

In a fourth aspect, the computer readable storage medium provided in the present disclosure has a computer program stored thereon, where the computer program is executed by a processor to implement the method according to any solution of the first aspect.

In a fifth aspect, the system for sign language translation provided in the present disclosure includes: a terminal device and the server according to any solution of the third aspect.

According to a method, an apparatus, a device and a system for sign language translation provided in the present disclosure, a server receives video information sent by a terminal device, and preprocesses the video information to obtain at least one sign language action; the at least one sign language action is input into a sign language model for classification and prediction to obtain a word corresponding to the at least one sign language action; the each word is input into a language model to determine whether an intention expression is complete; and the each word is sent to a terminal device when the intention expression is complete. It can be seen that the word corresponding to the sign language action is obtained by using the sign language model to identify the sign language action in the video information. Furthermore, the language model is used to determine completeness of the intention expressed by the each word. When the intention expression is complete, the each word is sent to the terminal device so that the terminal device displays the each word, thereby realizing the translation of the sign language action into words, enabling the ordinary person to better understand intentions of the hearing impaired, thus improving efficiency of communications between the hearing impaired and the ordinary people, and helping the hearing impaired to better integrate into the social life.

DESCRIPTION OF DRAWINGS

In order to more clearly illustrate technical solutions in embodiments of the present disclosure or in the prior art, the drawings used in the description of the embodiments or the prior art will be briefly described below. Obviously, the drawings in the following description are only some embodiments of the present disclosure. For persons of ordinary skill in the art, other drawings may be obtained based on these drawings without any creative effort.

DESCRIPTION OF EMBODIMENTS

The technical solutions in the embodiments of the present disclosure will be described hereunder clearly and completely with reference to the accompanying drawings in the embodiments of the present disclosure. It is obvious that the described embodiments are only part of the embodiments, rather than all embodiments of the present disclosure. All other embodiments obtained by persons of ordinary skill in the art without creative efforts fall into the scope of the present disclosure.

The terms such as "first", "second", "third", "fourth" and the like (if any) in the specification, claims and the above drawings are used to distinguish similar objects, but not necessarily to describe a specific order or precedence order. It should be understood that the data so used are interchangeable as appropriate, such that the embodiments of the present disclosure described herein can be implemented, for instance, in a sequence other than those illustrated or described herein. In addition, the terms "comprise", "have" and any variation thereof are intended to cover a non-exclusive inclusion, e.g., processes, methods, systems, products, or devices including a series of steps or units are not necessarily limited to those steps or units explicitly listed, but which may include other steps or units not explicitly listed or inherent to these processes, methods, products or devices.

As stated above, at present, in order to improve the convenience of communication between the hearing impaired and ordinary people, some sign language robots that convert voice into sign language actions have emerged. By presetting a conversion command in a robot, a common voice in a specific scenario is translated through a one-to-one mapping relationship into a corresponding sign language action to enable the hearing impaired to better understand intentions of the ordinary people.

However, the above prior art sign language robot can only be used to translate voice into a sign language action, but cannot translate the sign language action into text, resulting in a problem that ordinary people cannot understand intentions of the hearing impaired well.

The present disclosure provides a method, an apparatus, a device and a system for sign language translation. By identifying a sign language action in a video, the sign language action can be translated into text so that an ordinary person can better understand intentions of the hearing impaired.

The technical solutions of the present disclosure will be described in detail below with specific embodiments. The following specific embodiments may be combined with each other, and for the same or similar concepts or processes, details may not be described in some embodiments again.

Figure 1:
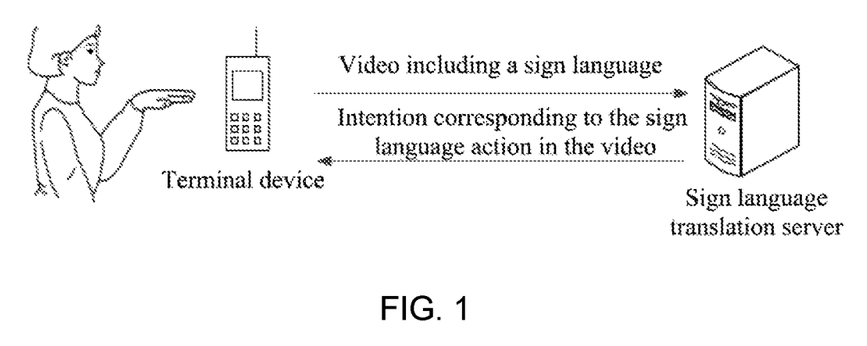
FIG. 1 is a schematic diagram of a scenario applicable to a method for sign language translation according to the present disclosure.

FIG. 1 is a schematic diagram of a scenario applicable to a method for sign language translation according to the present disclosure. As shown in FIG. 1, in the scenario where a hearing impaired person communicates with an ordinary person, a terminal device collects video information including a sign language action of the hearing impaired person, and sends video information to a sign language translation server. The sign language translation server identifies the sign language action in the video information, obtains an intention corresponding to the sign language action in the video information, and returns the intention to the terminal device for display.

It should be noted that the terminal device may be an electronic device with a collection function, including but not limited to: a mobile phone, a camera, a laptop, a translation robot, and the like. A sign language translation service may be integrated in the terminal device in a software form, and may also exist independently in a hardware form.

Figure 2:
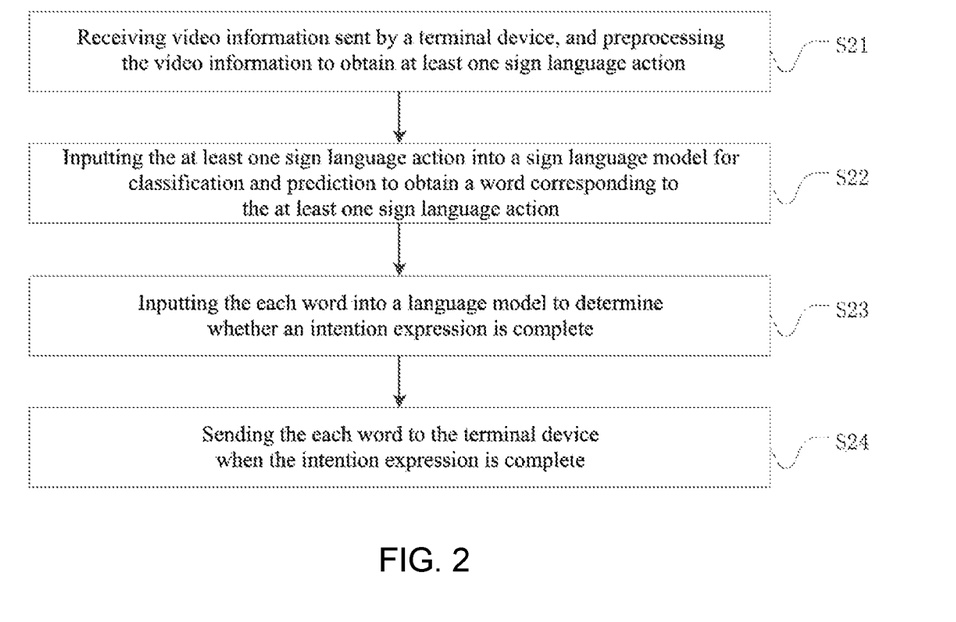
FIG. 2 is a flow chart illustrating embodiment 1 of a method for sign language translation according to the present disclosure.

FIG. 2 is a flow chart illustrating embodiment 1 of a method for sign language translation according to the present disclosure. The executive body of this embodiment may be an apparatus for sign language translation. Specifically, the apparatus may be disposed in the terminal device, or may be disposed in the sign language translation server, where the server may be a cloud server or a local server. In this embodiment, description is made by taking an example where the apparatus is disposed in the server.

As shown in FIG. 2, the method in this embodiment includes:

S21: receiving video information sent by a terminal device, and preprocessing the video information to obtain at least one sign language action.

The terminal device may be an electronic device with a collection function, including but not limited to: a mobile phone, a camera, a laptop, a translation robot, and the like. When the hearing impaired person communicates with the ordinary person, the terminal device may collect video information including a sign language action of the hearing impaired person, and send the video information to the server performing the method of this embodiment.

After receiving the video information sent by the terminal device, the server may preprocess the video information to obtain at least one sign language action. Understandably, since the hearing impaired person is not always in a conversation state during the communication process, some image frames in the collected video information may not have a sign language action. Therefore, the process of preprocessing the video information may include: removing an image frame which obviously does not include the sign language action, for instance, it may be determined, from a change in a hand state of the hearing impaired person in the video information, whether or not the sign language action is included in the image frame. Specifically, if, in adjacent frames of images, there is no change in the hand state of the hearing impaired person, then it may be determined that the sign language action is not included in the image frames; if, in adjacent frames of images, there is a change in the hand state of the hearing impaired person, then it may be preliminarily determined that the sign language action is included in the image frames.

Optionally, the process of preprocessing the video information may further include: after a preliminary determination that the sign language action is included in the image frames, separating the image frames by using an image segmentation technique to obtain the sign language action in the image frames. It should be noted that the sign language action is not specifically limited in the present disclosure with regard to its representation, which may be an image corresponding to a hand region in the images or feature information corresponding to the sign language action obtained by using a preset algorithm.

In a specific implementation process, the representation of the sign language action may be determined according to an input requirement from the sign language model. For instance, when the input of the sign language model is an image, the sign language action obtained in this step may be a hand region in the image; when the input of the sign language model is feature information corresponding to the sign language action, the sign language action obtained in this step may be the feature information of the sign language action obtained by using the preset algorithm.

Optionally, the process of preprocessing the video information may further include: adjusting a size and/or a format of the image frames in the video. Understandably, the image frames in the video may be adjusted to an appropriate size and format according to the input requirement from the sign language model, for instance, the image frames are adjusted to an image with a size of 256 pixels*256 pixels and a format of JPGE.

It should be noted that the order of the foregoing preprocessing processes is not specifically limited in this embodiment.

S22: inputting the at least one sign language action into a sign language model for classification and prediction to obtain a word corresponding to the at least one sign language action.

Specifically, a trained sign language model is running on the server, and after the sign language action is input to the sign language model, the sign language model may output a word corresponding to the sign language action, where the sign language model is trained by a deep learning algorithm.

It should be noted that the training process and the training algorithm for the sign language model are not specifically limited in this embodiment, and the training may be conducted by means of a plurality of machine learning algorithms. For an alternative embodiment, reference may be made to embodiment 3 as follow.

In addition, the number of sign language models running on the server may be one or more, which is not specifically limited in the present disclosure. In an optional implementation, when one sign language model is running on the server, the parsed sign language actions are sequentially input into the sign language model for classification and prediction according to the order of the image frames in the video information. In another optional implementation, a plurality of processors may be disposed in the server, and the sign language model is running on the plurality of processors separately. When the prediction is performed, a plurality of sign language actions in the video information may be input into different sign language models to improve efficiency and instantaneity of the prediction.

S23: inputting the each word into a language model to determine whether an intention expression is complete.

S24: sending the each word to the terminal device when the intention expression is complete.

Specifically, since the sign language model outputs the word corresponding to the sign language action, in the present disclosure, the word is not directly output to the terminal device in order to ensure accuracy of the sign language translation, instead the word is input into the language model which then outputs the word to the terminal device after the language model determines that the intention expression is complete. For instance, a trained language model is running on the server, and the language model may determine completeness of the intention expression. After the sign language model performs the classification and predication for the sign language action to obtain a corresponding word as in S22, the word is input into the language model, and the language model determines whether the intention expression is complete.

In a specific implementation, the language model may use any language model in the prior art. Optionally, when the target translation language of the sign language is Chinese, the language model is an N-gram model. N-gram is an algorithm based on a statistical language model. The N-gram model utilizes collocation information of adjacent words in the context, and a sentence with the greatest probability may be calculated according to the input words, thus realizing a conversion of words to a sentence.

For instance, when the words respectively input into the language model are "I" and "find", the language model may determine that the intention expression is incomplete; if the word subsequently input into the language model is "an error", the language model may determine that the intention expression is complete, and the statement corresponding to the intention is "I find an error".

It can be understood that, when the intention expression is incomplete, the each word input into the language model is temporarily not output, and a word subsequently input is awaited; when the intention expression is complete, the each word expressing the intention is sent to the terminal device. For instance, in the above example, the respective words sent by the server to the terminal are "I", "find", and "an error".

After receiving the words, the terminal device can display the words. For instance, the text corresponding to "I find an error" is displayed on a display screen so that the ordinary person can understand, according to text information displayed by the terminal device, the intention expressed in the sign language action of the hearing impaired person.

In an optional implementation, the server may further receive a translation type sent by the terminal device. For instance, the user may set a translation type on the terminal device according to a conversation scenario, where the translation type includes: a voice type and/or a text type. Correspondingly, the server may send the each word to the terminal device in a voice form and/or a text form according to the translation type.

Specifically, if the translation type is a voice type, when it is determined in S24 that the intention expression is complete, the each word is converted into a voice form by using a voice conversion algorithm, and then sent to the terminal device so that the terminal device can play the each word in the voice form. If the translation type is a text type, when it is determined in S24 that the intention expression is complete, the each word is directly sent to the terminal device in a text form to allow the terminal device to display the each word in the text form. In this embodiment, the sign language may be selected for a translation into voice or text according to a scenario of communications between the hearing impaired person and the ordinary person, which further enhances the flexibility of the sign language translation.

In this embodiment, video information sent by a terminal device is received, and the video information is preprocessed to obtain at least one sign language action; the at least one sign language action is input into a sign language model for classification and prediction to obtain a word corresponding to the at least one sign language action; the each word is input into a language model to determine whether an intention expression is complete; and the each word is sent to the terminal device when the intention expression is complete. It can be seen that the word corresponding to the sign language action is obtained by using the sign language model to identify the sign language action in the video information. Furthermore, the language model is used to determine completeness of the intention expressed by the each word. When the intention expression is complete, the each word is sent to the terminal device so that the terminal device displays the each word, thereby realizing the translation of the sign language action into words, enabling the ordinary persons to better understand intentions of the hearing impaired, thus improving efficiency of communications between the hearing impaired and the ordinary people, and helping the hearing impaired to better integrate into the social life.

Figure 3:
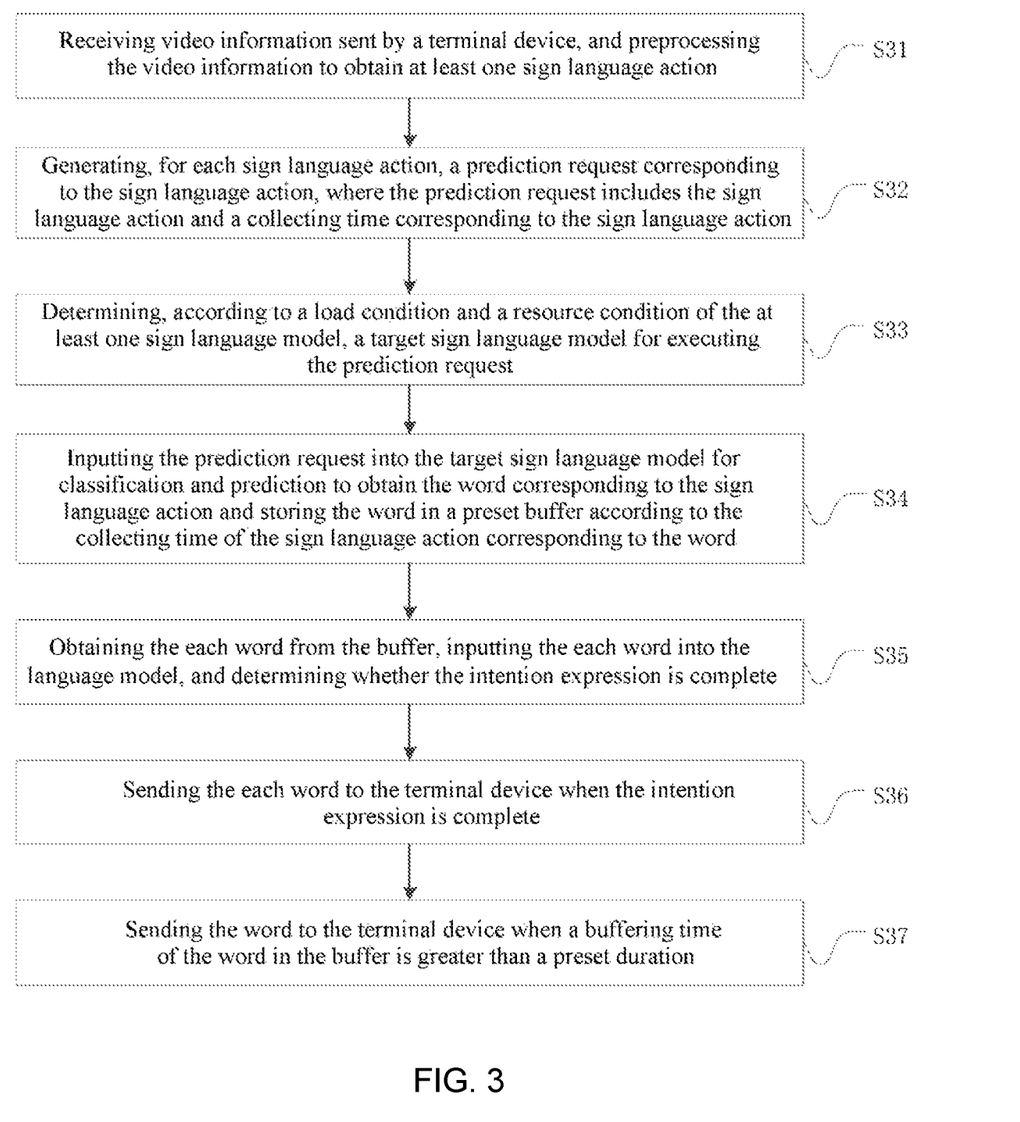
FIG. 3 is a flow chart illustrating embodiment 2 of a method for sign language translation according to the present disclosure.

FIG. 3 is a flow chart illustrating embodiment 2 of a method for sign language translation according to the present disclosure. Based on the foregoing embodiments, implementation details of the solution of the present disclosure are described in detail in this embodiment. As shown in FIG. 3, the method for sign language translation according to the present disclosure includes:

S31: receiving video information sent by a terminal device, and preprocessing the video information to obtain at least one sign language action.

For a specific implementation of S31 in this embodiment, reference may be made to S21 in embodiment 1 described above, and details will not be described herein again.

S32: generating, for each sign language action, a prediction request corresponding to the sign language action, where the prediction request includes the sign language action and a collecting time corresponding to the sign language action.

Specifically, when the terminal device collects video information, a specific collecting time is recorded for each image frame. When the video information is preprocessed to obtain each sign language action, a collecting time corresponding to each sign language action may also be obtained according to time information recorded in the video information. A prediction request is generated for each sign language action, and the prediction request will be input into a sign language model for classification and prediction. The collecting time corresponding to the sign language action in the prediction request may be used as a collecting time of the each word output by the sign language model, and the order of the each word may be determined according to the collecting time of the each word.

S33: determining, according to a load condition and a resource condition of the at least one sign language model, a target sign language model for executing the prediction request.

In a specific implementation, a scheduling module and a plurality of processing modules may be provided in the server, and each processing module is configured to run a sign language model. The scheduling module is configured to generate a corresponding prediction request for each sign language action, and is also used for load balancing and resource scheduling of the plurality of processing modules. Specifically, a target sign language model for executing the prediction request is determined according to a load condition and a resource condition of sign language models in the plurality of processing modules, for instance, a sign language model with fewer loads or a sign language model with sufficient resources is preferentially selected as the target sign language model.

S34: inputting the prediction request into the target sign language model for classification and prediction to obtain the word corresponding to the sign language action, and storing the word in a preset buffer according to the collecting time of the sign language action corresponding to the word;

S35: obtaining the each word from the buffer, inputting the each word into the language model, and determining whether the intention expression is complete.

Since there may be a case that classification and prediction are performed by a plurality of sign language models for different sign language actions at the same time, after each sign language model obtains a word after the classification and prediction, the word may be stored in a preset buffer according to the collecting time of the sign language action. For instance, words are stored in the buffer in order according to the sequence of the collecting time of the sign language actions, or words are stored in the buffer according to the order in which the sign language model outputs the words, and the collecting time corresponding to the words is recorded.

Further, according to the collecting time of the each word, the each word is obtained from the buffer, and input into the language model to determine whether the intention expression is complete.

In this embodiment, by setting the word buffer, on the one hand, it can be ensured that the words are output in order, and on the other hand, the processing speed of the sign language model can be adapted to that of the language model.

S36: sending the each word to the terminal device when the intention expression is complete.

S37: sending the word to the terminal device when a buffering time of the word in the buffer is greater than a preset duration.

Understandably, in order to ensure instantaneity of sign language translation, the word is sent to the terminal device when a buffering time of the word in the buffer is greater than a preset duration.

Figure 4:
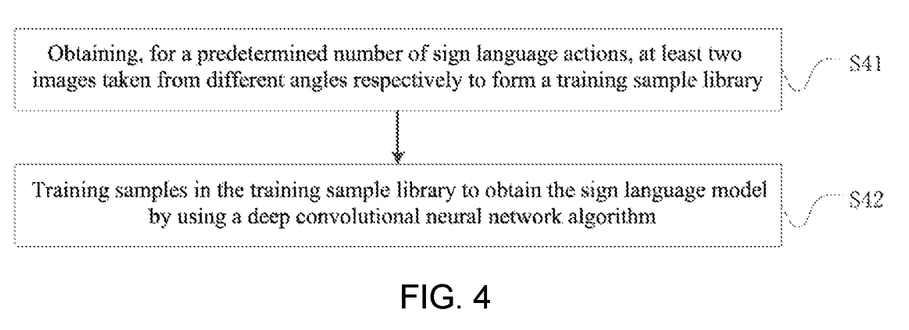
FIG. 4 is a flow chart illustrating embodiment 3 of a method for sign language translation according to the present disclosure.

FIG. 4 is a flow chart illustrating embodiment 3 of a method for sign language translation according to the present disclosure. The executive body of this embodiment is a server. Based on the above embodiments, a training process for a sign language model is described in detail in this embodiment. As shown in FIG. 4, an alternative method for training a sign language model, including:

S41: obtaining, for a predetermined number of sign language actions, at least two images taken from different angles respectively to form a training sample library.

Since a collecting apparatus used by the hearing impaired person for the terminal device is not always front facing during actual use, in order to increase robustness of the sign language model, when a training sample library is created in this embodiment, at least two images taken from different angles respectively are obtained for each sign language action, and words corresponding to sign language actions in the images are marked.

S42: training samples in the training sample library to obtain the sign language model by using a deep convolutional neural network algorithm.

The structure of the deep convolutional neural network used in this embodiment includes a convolutional layer, a pooling layer and a fully connected layer, where the convolutional layer is used for feature extraction of an input image, the pooling layer is used for downsampling a feature, and the fully connected layer is used for connecting all features and sending output values to a classifier.

Specifically, in the training process, the samples in the training sample library are trained for use with back propagation and gradient descent. Further, the training sample library may also be divided into a training set and a test set. Samples in the training set are used for training of the sign language model, and samples in the test set are used for verification of the sign language model.

Due to a learning characteristic of the model, the number of samples may be continuously increased in the training sample library, and the sign language model may be iteratively extended so that the sign language model is continuously enriched and its identification ability is continuously enhanced. In a specific implementation, for each well-trained sign language model, an old model that is running online may be gradually replaced with a small traffic online approach in order to achieve the purpose of dynamic expansion and generalization of the model with the traffic, and thus extensibility of the sign language model is improved.

Figure 5:
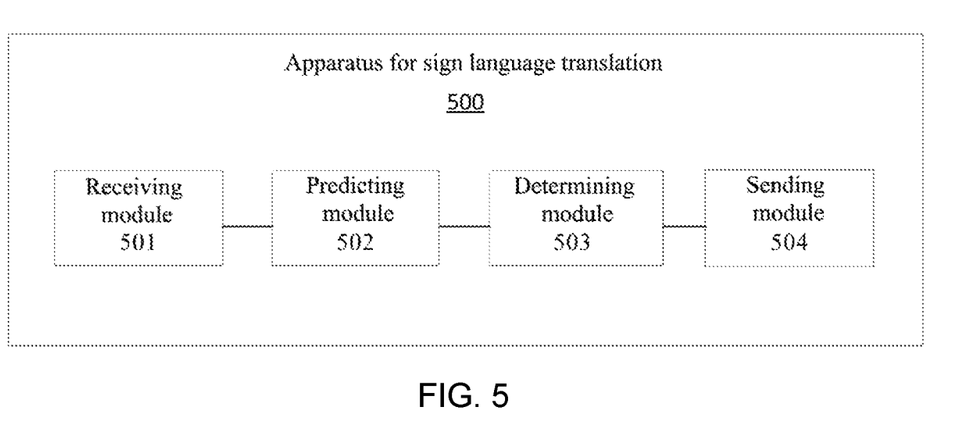
FIG. 5 is a schematic structural diagram illustrating embodiment 1 of an apparatus for sign language translation according to the present disclosure.

FIG. 5 is a schematic structural diagram illustrating embodiment 1 of an apparatus for sign language translation according to the present disclosure. The apparatus in this embodiment may be disposed in the terminal device, and may also be disposed in the sign language translation server. As shown in FIG. 5, the apparatus 500 for sign language translation in this embodiment includes a receiving module 501, a predicting module 502, a determining module 503, and a sending module 504.

The receiving module 501 is configured to receive video information sent by a terminal device, and preprocess the video information to obtain at least one sign language action.

The predicting module 502 is configured to input the at least one sign language action into a sign language model for classification and prediction to obtain a word corresponding to the at least one sign language action;

The determining module 503 is configured to input the each word into a language model to determine whether an intention expression is complete.

The sending module 504 is configured to send the each word to the terminal device when the intention expression is complete.

Optionally, the predicting module 502 is specifically configured to generate, for each sign language action, a prediction request corresponding to the sign language action, where the prediction request includes the sign language action and a collecting time corresponding to the sign language action; determine, according to a load condition and a resource condition of the at least one sign language model, a target sign language model for executing the prediction request; input the prediction request into the target sign language model for classification and prediction to obtain the word corresponding to the sign language action.

Optionally, the predicting module 502 is further configured to store the word in a preset buffer according to the collecting time of the sign language action corresponding to the word; correspondingly, the determining module 503 is specifically configured to obtain the each word from the buffer, and input the each word into the language model.

Optionally, the sending module 504 is further configured to send the word to the terminal device when a buffering time of the word in the buffer is greater than a preset duration.

Optionally, the receiving module 501 is further configured to receive a translation type sent by the terminal device, where the translation type includes: a voice type and/or a text type; correspondingly, the sending module 504 is specifically configured to send the each word to the terminal device in a voice form and/or a text form according to the translation type.

Optionally, the language model is an N-gram model.

The apparatus in this embodiment may be used to implement the foregoing method embodiments as shown in FIG. 2 and FIG. 3, and implementation principles and technical effects between them are similar, therefore details will not be described herein again.

Figure 6:
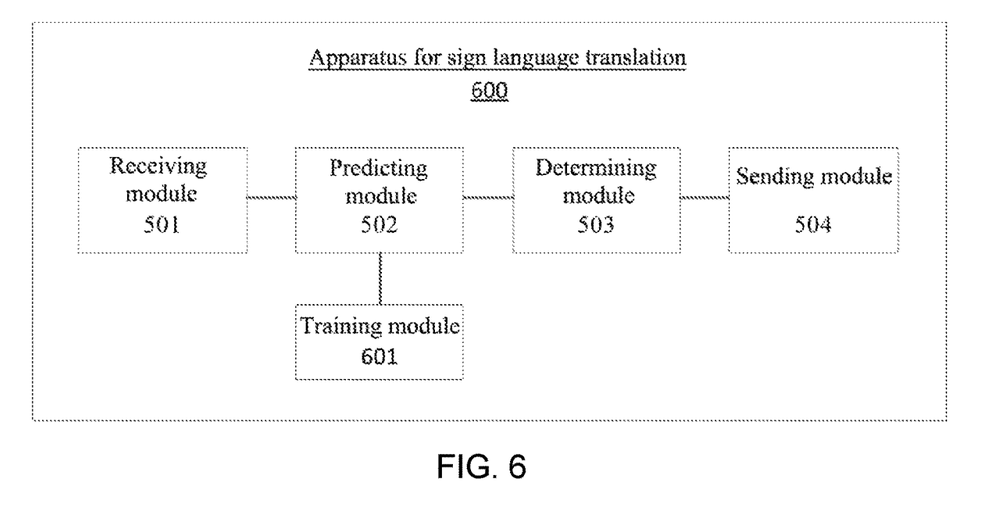
FIG. 6 is a schematic structural diagram illustrating embodiment 2 of an apparatus for sign language translation according to the present disclosure.

FIG. 6 is a schematic structural diagram illustrating embodiment 2 of an apparatus for sign language translation according to the present disclosure. As shown in FIG. 6, on the basis of the embodiment shown in FIG. 5, the apparatus 600 for sign language translation in this embodiment may further include a training module 601.

The training module 601 is configured to: obtain, for a predetermined number of sign language actions, at least two images taken from different angles respectively to form a training sample library; and train samples in the training sample library to obtain the sign language model by using a deep convolutional neural network algorithm.

The apparatus in this embodiment may be used to implement the foregoing method embodiment as shown in FIG. 4, and implementation principles and technical effects between them are similar, therefore details will not be described herein again.

Figure 7:
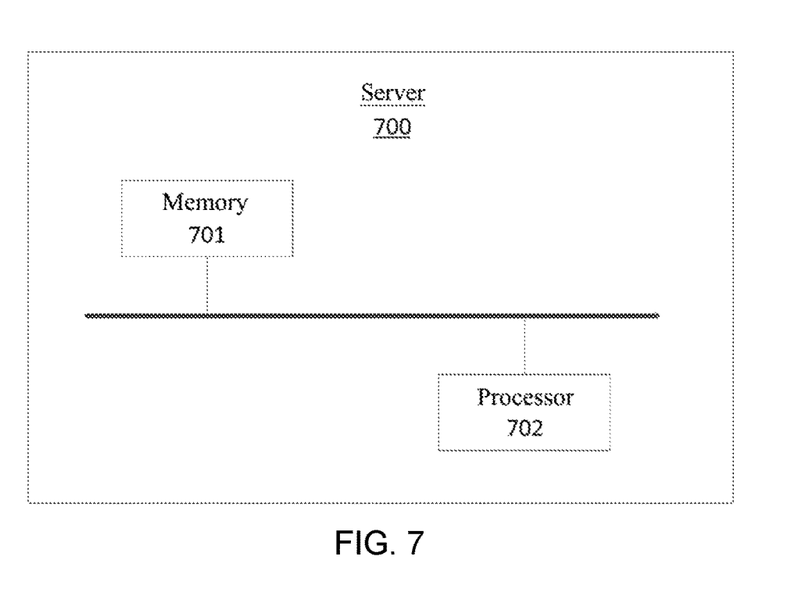
FIG. 7 is a schematic structural diagram illustrating an embodiment of a server according to the present disclosure.

FIG. 7 is a schematic structural diagram illustrating an embodiment of a server according to the present disclosure. As shown in FIG. 7, the server 700 in this embodiment includes: a memory 701, a processor 702, and a computer program, where the computer program is stored in the memory 701 and configured to be executable by the processor 702 to implement the technical solution in any one of the above method embodiments. As implementation principles and technical effects in this embodiment are similar to those in the above method embodiments, details will not be described herein again.

An embodiment of the present disclosure further provides a computer readable storage medium having a computer program stored thereon, and when the computer program is executed by a processor, the technical solution in any of the foregoing method embodiments can be implemented. As implementation principles and technical effects in this embodiment are similar to those in the forgoing method embodiments, details will not be described herein again.

Figure 8:
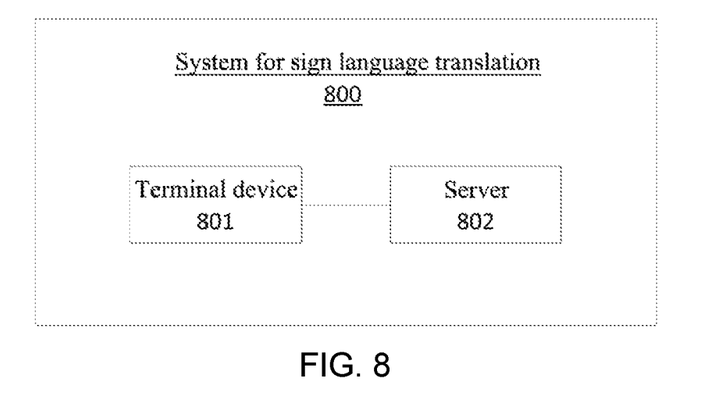
FIG. 8 is a schematic structural diagram illustrating an embodiment of a system for sign language translation according to the present disclosure.

FIG. 8 is a schematic structural diagram illustrating an embodiment of a system for sign language translation according to the present disclosure. As shown in FIG. 8, the system 800 for sign language translation in this embodiment may include a terminal device 801 and a server 802, where the server 802 may use a structure as shown in FIG. 7.

Specifically, the terminal device 801 is configured to collect video information and send the video information to the server 802, where the video information includes at least one sign language action.

The terminal device 801 is further configured to receive a word sent by the server 802.

Optionally, the terminal device 801 is further configured to send a translation type to the server 802, where the translation type includes: a voice type and/or a text type.

Correspondingly, the terminal device 801 is further configured to display the word in a text form or play the word in a voice form according to the translation type.

The system for sign language translation in this embodiment may be used to implement the technical solution in any of the foregoing method embodiments. As implementation principles and technical effects in this embodiment are similar to those in the foregoing method embodiments, details will not be described herein again.

In several embodiments provided in the present disclosure, it should be understood that the disclosed apparatus and method may be implemented in other manners. For instance, the apparatus embodiments described above are merely illustrative. For instance, the division of units is only a logical function division. In an actual implementation, there may be other division manners. For instance, units or components may be combined or integrated to another system, or some features can be ignored or not executed. In addition, the mutual couplings, direct couplings or communication connections shown or discussed herein may be implemented through some interfaces. The indirect couplings or communication connections between devices or units may be implemented in an electrical form, a mechanical form or other forms.

The units described as separate components may or may not be physically separated, and the components shown as units may or may not be physical units, that is, may be located in one place, or may be distributed to a plurality of network units. Some or all of the units may be selected according to actual needs to achieve the purpose of the solutions of the present embodiments.

In addition, each functional unit in each embodiment of the present disclosure may be integrated into one processing unit, or each unit may exist alone physically, or two or more units may be integrated into one unit. The above integrated unit can be implemented in the form of hardware or in the form of hardware and software functional units.

The above integrated unit implemented in the form of software functional units may be stored in a computer readable storage medium. The above software functional unit is stored in a storage medium and includes instructions for enabling a computer device (which may be a personal computer, a server, or a network device, etc.) or a processor to perform part of the steps in the method embodiments of the present disclosure. The foregoing storage medium includes: various media capable of storing program codes, such as a flash memory, a mobile hard disk, a read-only memory (ROM), a random access memory (RAM), a magnetic disk, an optical disk, or the like.

In the described embodiment of the network device or the terminal device, it should be understood that the processor may be a central processing unit (CPU), or other general-purpose processor, digital signal processor (DSP), application specific integrated circuit (ASIC), etc. The general purpose processor may be a microprocessor, any conventional processor or the like. The steps of the method disclosed in conjunction with the present application may be directly embodied by the execution of the hardware processor or by a combination of hardware and software modules in the processor.

Finally, it should be noted that the above embodiments are merely illustrative of the technical solutions of the present disclosure, but are not intended to limit the present disclosure; although the present disclosure has been described in detail with reference to the foregoing embodiments, those skilled in the art will understand that they may make modifications to the technical solutions described in the above embodiments, or make equivalent replacement to some or all of the technical features therein; and these modifications or replacements do not essence of a corresponding technical solution deviate from the scope of technical solutions of the embodiments of the present disclosure.

What is claimed is:

1. A method for sign language translation, comprising:
   receiving video information sent by a terminal device and preprocessing the video information to obtain at least one sign language action;
   inputting the at least one sign language action into a sign language model for classification and prediction to obtain a word corresponding to the at least one sign language action;
   inputting the each word into a language model to determine whether an intention expression is complete; and
   sending the each word to the terminal device when the intention expression is complete,
   wherein the inputting the at least one sign language action into the sign language model for classification and prediction to obtain the word corresponding to the at least one sign language action comprises:
   generating, for each sign language action, a prediction request corresponding to the sign language action, wherein the prediction request comprises the sign language action and a collecting time corresponding to the sign language action;
   determining, according to a load condition and a resource condition of at least one sign language model, a target sign language model for executing the prediction request and
   inputting the prediction request into the target sign language model for classification and prediction to obtain the word corresponding to the sign language action.

2. The method according to claim 1, after the obtaining the word corresponding to the at least one sign language action, further comprising:
   storing the word in a preset buffer according to the collecting time of the sign language action corresponding to the word;
   correspondingly, the inputting the each word into the language model comprises:
   obtaining the each word from the buffer, and inputting the each word into the language model.

3. The method according to claim 2, further comprising:
   sending the word to the terminal device when a buffering time of the word in the buffer is greater than a preset duration.

4. The method according to claim 1, before the inputting the at least one sign language action into the sign language model for classification and prediction to obtain the word corresponding to the at least one sign language action, further comprising:
   obtaining, for a predetermined number of sign language actions, at least two images taken from different angles respectively to form a training sample library; and
   training samples in the training sample library to obtain the sign language model by using a deep convolutional neural network algorithm.

5. The method according to claim 1, further comprising:
   receiving a translation type sent by the terminal device, wherein the translation type comprises: a voice type and/or a text type;
   correspondingly, the sending the each word to the terminal device comprises:
   sending the each word to the terminal device in a voice form and/or a text form according to the translation type.

6. The method according to claim 1, wherein the language model is an N-gram model.

7. A computer readable storage medium having a computer program stored thereon, wherein the computer program is executed by a processor to implement the method according to claim 1.

8. The method according to claim 1, wherein the preprocessing the video information comprises:
   removing an image frame which does not include any sign language action.

9. The method according to claim 1, wherein the preprocessing the video information comprises:
   after a preliminary determination that a sign language action is included in an image frame, separating the image frame using image segmentation to obtain the sign language action in the image frame.

10. The method according to claim 1, wherein the preprocessing the video information comprises:
    adjusting at least one of a size and a format of an image frame in the video information according to an input requirement of the sign language model.

11. An apparatus for sign language translation, comprising: a processor and a computer-readable medium for storing program codes, which, when executed by the processor, cause the processor to:
    receive video information sent by a terminal device, and preprocess the video information to obtain at least one sign language action;
    input the at least one sign language action into a sign language model for classification and prediction to obtain a word corresponding to the at least one sign language action;
    input the each word into a language model to determine whether an intention expression is complete; and
    send the each word to the terminal device when the intention expression is complete,
    wherein the program codes further cause the processor to:
    generate, for the each sign language action, a prediction request corresponding to the sign language action, wherein the prediction request comprises the sign language action and a collecting time corresponding to the sign language action;
    determine, according to a load condition and a resource condition of the at least one sign language model, a target sign language model for executing the prediction request; and input the prediction request into the target sign language model for classification and prediction to obtain the word corresponding to the sign language action.

12. The apparatus according to claim 11, wherein the program codes further cause the processor to:
store the word in a preset buffer according to the collecting time of the sign language action corresponding to the word; and
obtain the each word from the buffer, and input the each word into the language model.

13. The apparatus according to claim 12, wherein the program codes further cause the processor to send the word to the terminal device when a buffering time of the word in the buffer is greater than a preset duration.

14. The apparatus according to claim 11, wherein program codes further cause the processor to:
obtain, for a predetermined number of sign language actions, at least two images taken from different angles respectively to form a training sample library; and
train samples in the training sample library to obtain the sign language model by using a deep convolutional neural network algorithm.

15. The apparatus according to claim 11, wherein the program codes further cause the processor to:
receive a translation type sent by the terminal device, wherein the translation type comprises: a voice type and/or a text type; and
send the each word to the terminal device in a voice form and/or a text form according to the translation type.

16. The apparatus according to claim 11, wherein the language model is an N-gram model.

17. The apparatus according to claim 11, wherein the program codes further cause the processor to:
remove an image frame which does not include any sign language action.

18. The apparatus according to claim 11, wherein the program codes further cause the processor to:
after a preliminary determination that a sign language action is included in an image frame, separate the image frame using image segmentation to obtain the sign language action in the image frame.

19. The apparatus according to claim 11, wherein the program codes further cause the processor to:
adjust at least one of a size and a format of an image frame in the video information according to an input requirement of the sign language model.

20. A method for sign language translation, comprising:
receiving video information sent by a terminal device and preprocessing the video information to obtain at least one sign language action;
inputting the at least one sign language action into a sign language model for classification and prediction to obtain a word corresponding to the at least one sign language action;
inputting the each word into a language model to determine whether an intention expression is complete; and
sending the each word to the terminal device when the intention expression is complete,
wherein before the inputting the at least one sign language action into the sign language model for classification and prediction to obtain the word corresponding to the at least one sign language action, the method further comprises:
obtaining, for a predetermined number of sign language actions, at least two images taken from different angles respectively to form a training sample library; and
training samples in the training sample library to obtain the sign language model by using a deep convolutional neural network algorithm.

* * * * *